(12) United States Patent
Crook et al.

(10) Patent No.: US 6,754,772 B2
(45) Date of Patent: Jun. 22, 2004

(54) DISTRIBUTED CACHE

(75) Inventors: Neal A. Crook, Berkshire (GB); Alan Wootton, Saratoga, CA (US)

(73) Assignee: Micron Technology, Inc., Boise, ID (US)

(*) Notice: Subject to any disclaimer, the term of this patent is extended or adjusted under 35 U.S.C. 154(b) by 164 days.

(21) Appl. No.: 09/987,765

(22) Filed: Nov. 15, 2001

(65) Prior Publication Data

US 2003/0093623 A1 May 15, 2003

(51) Int. Cl.$^7$ .............................................. G06F 12/08
(52) U.S. Cl. ...................... 711/118; 711/138; 711/133; 711/141
(58) Field of Search ................................. 711/118, 129, 711/131, 133, 134, 136, 141, 145, 144, 138

(56) References Cited

U.S. PATENT DOCUMENTS

| | | | | |
|---|---|---|---|---|
| 5,040,129 A | * | 8/1991 | Nishiyama | 715/518 |
| 5,148,293 A | * | 9/1992 | Miyachi | 358/444 |
| 5,208,908 A | * | 5/1993 | Harrison et al. | 345/557 |
| 6,101,576 A | * | 8/2000 | Kobayashi et al. | 711/122 |
| 6,121,970 A | * | 9/2000 | Guedalia | 345/760 |
| 6,181,352 B1 | | 1/2001 | Kirk et al. | |

* cited by examiner

Primary Examiner—Hiep T. Nguyen
(74) Attorney, Agent, or Firm—Dickstein Shapiro Morin & Oshinsky LLP

(57) ABSTRACT

A system and method for distributed cache. Cache tag storage and cache data storage are maintained in separate pipeline stages. Cache tag storage is operated by a data producer. Cache data storage is operated by a data consumer. Cache hits and misses are determined by the data producer prior to any operations being performed by the processor. In the event of a cache miss, produced data is sent to the processor to be processed. In the event of a cache hit, the cache address of the corresponding previously processed data is sent to the data consumer so that the corresponding processed data unit can be retrieved from cache data storage.

54 Claims, 7 Drawing Sheets

DISTRIBUTED CACHE

FIELD OF THE INVENTION

The present invention relates generally to caching processed data, and, more particularly, to a method and apparatus for distributing the functions of cache to different stages in an execution pipeline such that the stages can operate independently while saving processing time and preventing data hazards.

BACKGROUND OF THE INVENTION

The function of a 3D graphics processing pipeline for a computer is to represent a 3-dimensional scene on a 2-dimensional computer display screen. In order to change view-point within the 3-dimensional scene, the graphics processing pipeline must redraw the scene according to the new view-point; this can affect perspective, lighting, reflections, the obscuring or revealing of objects and so forth. This requires a large amount of calculation.

Consider the polygon shown in FIG. 1a. The symbols a, b, c, and d represent the vertices of the polygon. The characteristics of each vertex include such information as its position in 3-dimensional space (x,y,z Cartesian co-ordinates), its color, its transparency, and its texture.

When drawing a scene, the 3D graphics processor works with flat surfaces. The most complex surface that is guaranteed to be flat is a triangle. Therefore, part of the process of displaying the polygon abcd involves tessellating it into triangles. This process is shown in FIG. 1b. The polygon abcd is now represented by the two triangles abc and adc. For more complex shapes, tessellation can lead to the introduction of new vertices, as shown in the tessellation of FIG. 1c.

The task of drawing the polygon is now replaced by the task of drawing the two triangles abc and adc. One way of representing the task to the 3D graphics pipeline is to produce a sequence of triplets representing the vertices to be drawn: abcadc. Each identifier a, b, c, and d must uniquely define a particular vertex within a scene, but a vertex can be shared with several triangles. In addition, the identifier allows the characteristics of the vertex (the position, color, transparency, etc.) to be retrieved from storage elsewhere in the system.

Part of the functions performed by a 3D-graphics processor are shown in FIG. 2. The sequence of triplets is passed to data producer 20. Producer 20 is responsible for translating a vertex identifier "a" into the vertex characteristics "A". "a" represents a relatively small data item (for example, an 8-bit value) while "A" represents a number of relatively large data items (for example, 16, 32-bit values). The translation process is costly in terms of time and occupied system resources; for example, it might require a number of memory accesses and data conversion operations.

The vertex characteristics "A" are processed by a processor and the processed vertex "A'" is passed to the consumer (the next stage in the pipeline). The processing performed by the processor is costly in terms of time.

The vertices "a" and "c" are each processed twice for polygon abcd—once for triangle abc and once for triangle acd. The result of processing a given vertex is identical, irrespective of the triangle it is being processed for. It wastes resources to translate the vertex identifier and process the vertex multiple times, so performance would be improved by maintaining a cache of transformed vertices.

The rate at which producer 20, processor 21 and consumer 22 handle data is different and may vary on a triangle-by-triangle or vertex-by-vertex basis. With the system shown in FIG. 2, the slowest unit determines the rate at any time, and faster units are stalled. This is an inefficient use of resources.

One way to more efficiently utilize the resources of a 3D-graphics pipeline is by using the cache as shown in FIG. 3. Producer 30 translates a vertex identifier "a" and writes the translated vertex data "A" to data FIFO 31. Data FIFO 31 is a first in first out queue. Data is sent from producer 30 to data FIFO 31 where processor 32 can access it when ready. When producer 30 translates a vertex faster than processor 32 processes a vertex, multiple data units can be stored in data FIFO 31. Similarly, when processor 32 begins to processes data units at a faster rate than producer 30 translates vertices, processor 32, rather than stalling immediately, continues to read translated vertices from data FIFO 31 until it is empty.

Processor 32 maintains a cache tag storage 36 with tags containing the minimum amount of information A', B', C', D' required to uniquely identify a data unit incoming to processor 32, i.e. data A, B, C, D. The minimum amount of information required to uniquely identify a data unit that is stored in cache tag storage 36 can be the data unit itself, a shortened form of the data unit, or an identifier derived from the data unit. For each element A', B', C', D' of tag storage, there is a corresponding element of processed data A", B", C", D" stored in cache data storage 37. Thus, cache data storage 37 contains processed data A", B", C", D" corresponding to input data A, B, C, D previously processed by processor 32. The tags A', B', C', D' must be stored as well as the data A", B", C", D", so that the tags can be compared to the incoming data units before they are processed so the processor 32 can determine if there is cached data A", B", C", D" corresponding to incoming data A, B, C, D. When processor 32 removes a data unit from data FIFO 31, it checks to see whether the data unit has a corresponding tag A', B', C', D' currently in cache tag storage 36. If there is no corresponding tag in cache data storage 36, that is, processor 32 gets a cache "miss," processor 32 stores a tag for the incoming data unit from FIFO 31 in cache tag storage 36 by using a currently unused storage location or reallocating a location that currently holds an old tag in cache tag storage 36. Processor 32 also processes the incoming data unit and stores the newly processed data unit as cache data in the corresponding location in cache data storage 37. The processed data is also passed through multiplexor 33 under control of processor 32 to a FIFO 34 for processed data and from there to a data consumer 35. If processor 32 finds a cache tag in tag storage 36, that is, it gets a cache "hit," then processor 32 operates multiplexor 33 and cache data storage 37 so that the cache data, corresponding to the cache tag for which there was a "hit," is passed through FIFO 34 to consumer 35. Consumer 35 can then take each processed data unit from data FIFO 34 in the correct order. For a 3D graphics processing pipeline, processor 32 might transform vertex data "A" according to the point of view for which the scene is to be rendered and according to the way in which the scene is lit to produce processed data A".

There are, however, still some problems with the method discussed above. While a cache "hit" saves the latency associated with processor 32 having to reprocess previously processed data, it does not save the time taken by producer 30 to generate the stream ABCD from incoming data stream abcd or the time taken by processor 32 to check for cache hits and misses. In addition, the values A'B'C'D' are likely to be larger than abcd requiring greater storage capacity in cache tag storage 36.

Thus, there exists a desire and need for a system and method for more efficiently performing cache functions.

BRIEF SUMMARY OF THE INVENTION

The present invention mitigates the problems associated with the prior art and provides a unique method and system of distributed cache.

In accordance with an exemplary embodiment of the present invention, a cache tag storage is provided which is maintained by a producer which sends data to the processor. A cache data storage is also provided which holds data output from a processor. A producer determines cache hits and misses without performing any translations on the data, and passes cache hit information through a control path to the consumer without any involvement from the processor. A cache miss causes the producer to fetch and translate data and pass that data to the processor for processing. The producer implements a cache replacement algorithm and manages the cache tag storage in accordance with the algorithm.

The consumer uses information from the control path to allow it to read data from the output of the processor and the cache storage in the correct data order. The consumer also manages the cache data storage, in accordance with a cache replacement algorithm compatible with that used by the producer, by writing certain values that it has read from the output of the processor into the cache storage.

BRIEF DESCRIPTION OF THE DRAWINGS

The above and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to make and use the invention, and it is to be understood that structural changes may be made and equivalent structures substituted for those shown without departing from the spirit and scope of the present invention.

Figure 1A:
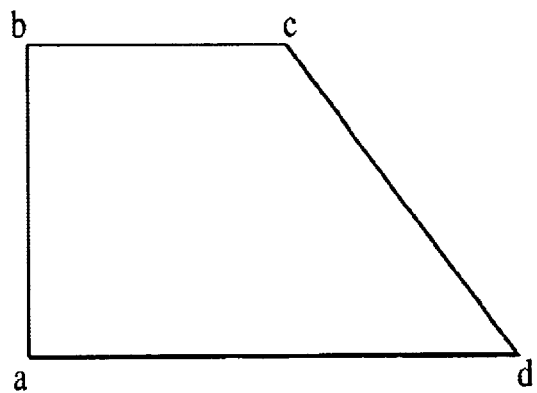
FIGS. 1a–1c are an illustration of the tessellation of a few shapes
Figure 1B:
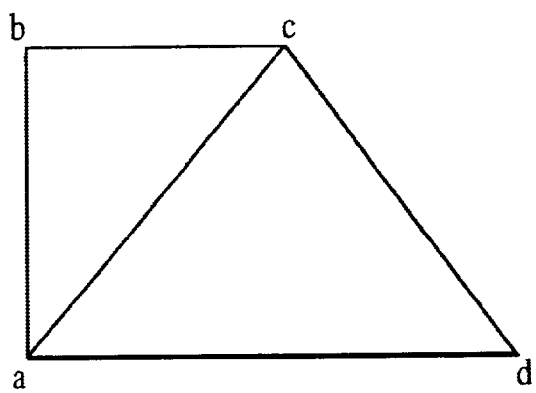
Figure 1C:
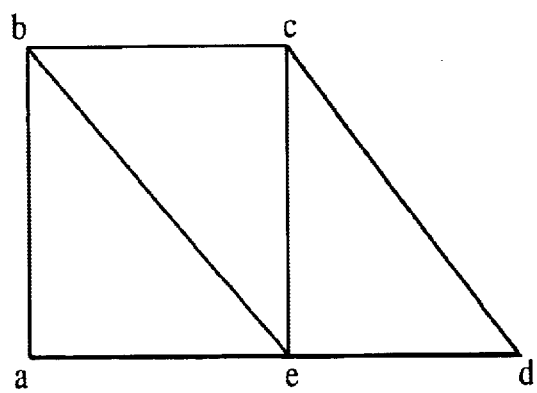
Figure 2:
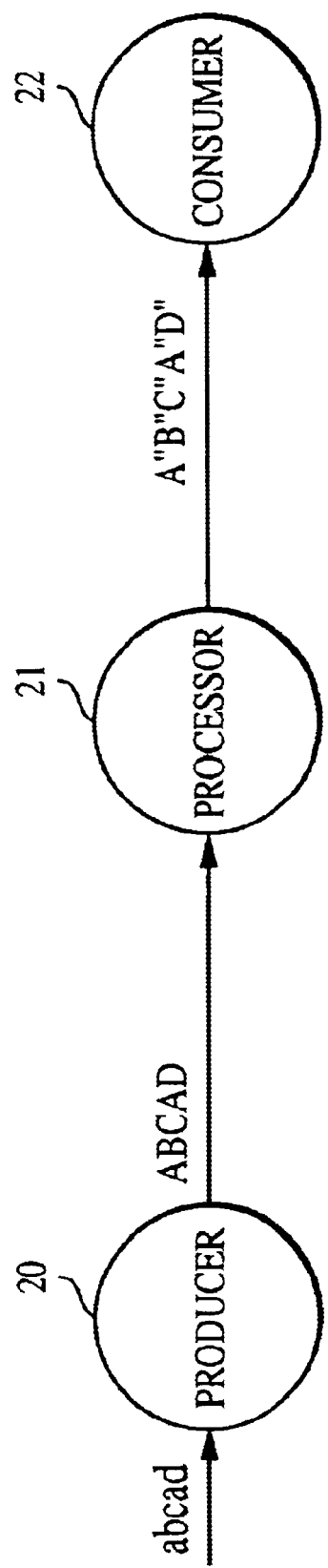
FIG. 2 is a block diagram of a conventional graphics pipeline.
Figure 3:
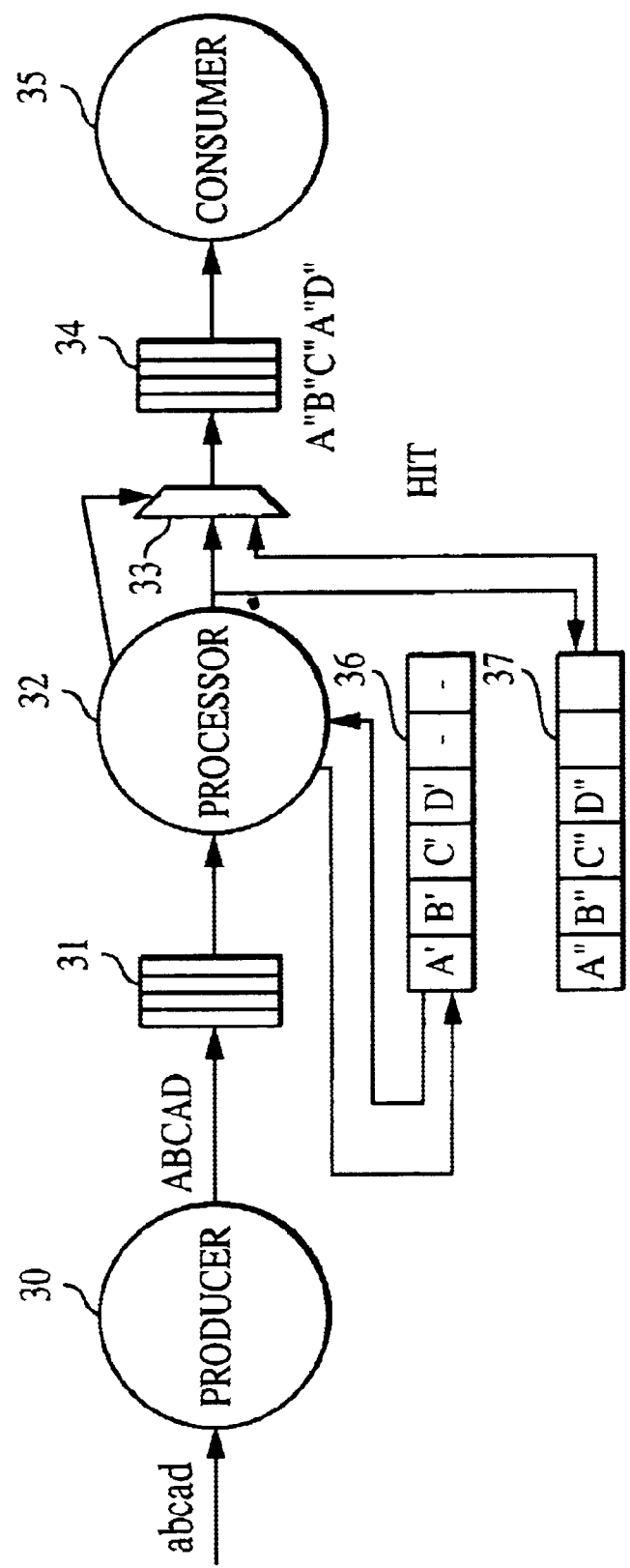
FIG. 3 is a block diagram of a conventional simple cache in a graphics pipeline.
Figure 4:
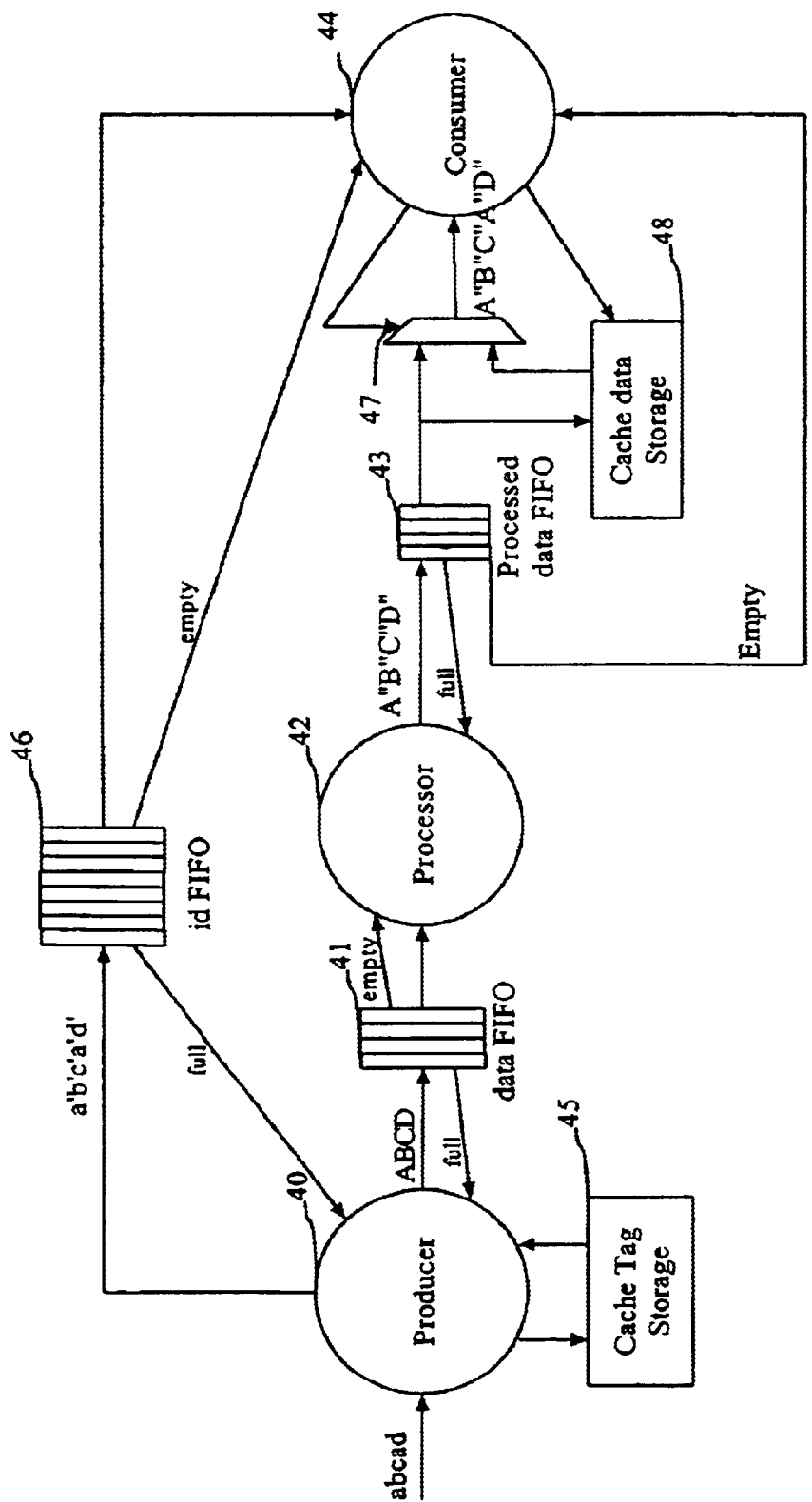
FIG. 4 is a block diagram of a first exemplary embodiment of a distributed cache in accordance with the present invention.

In accordance with a first exemplary embodiment of the present invention, a processor system can distribute the functions of a cache to increase system performance by eliminating re-fetching and re-processing of data. FIG. 4 illustrates the flow of data for a distributed cache in accordance with the first exemplary embodiment of the invention. The two cache storage elements, cache tag storage 45 and cache data storage 48, are controlled separately. Cache tag storage 45 is controlled by producer 40 while cache data storage 48 is controlled by consumer 44. A data path through identification FIFO 46 passes cache control information from producer 40 to consumer 44. Data FIFO 41, identification FIFO 46 and processed data FIFO 43 are all data storage elements that are operated as first in first out queues.

Incoming data units a, b, c, a, d, are sent to producer 40. When producer 40 receives an incoming data unit, e.g. "a", producer 40 examines cache tag storage 45 and determines whether data "a," or a derived data tag corresponding to data "a," is stored in cache tag storage 45 and will produce a cache "hit" or cache "miss." A cache hit means that the end result of processing the incoming data unit by processor 42 is already stored in cache data storage 48 and processor 42 does not have to reprocess the incoming data unit, while a cache miss means that the end result of processing the incoming data unit is not stored in cache data storage 48 and processor 42 must process the incoming data unit.

If an incoming data unit, e.g. "a," produces a cache "miss" when producer 40 examines cache tag storage 45, producer 40 uses a cache allocation and replacement algorithm to determine whether to allocate space for "a" in cache data storage 48. The simplest algorithm is to always allocate an entry on a cache miss, and always to replace the oldest data entry. However, any of the other algorithms for cache allocation and replacement that are well known in the art, such as, for example, replacing the least recently used data entry or the most recently used data entry may be used. If space is allocated for "a" in cache tag storage 45, producer 40 updates cache tag storage 45 to show that "a" is now in the cache. The allocation of space for a new entry in the cache may require the deletion of some other entry in the cache, which takes place in accordance with the cache allocation and replacement algorithm.

If an incoming data unit, e.g. "a," produces a cache "miss" when producer 40 examines cache tag storage 45, producer 40 then generates data "A" from data "a" which is then sent to data FIFO 41. When "A" becomes the oldest data unit in data FIFO 41, processor 42 will read "A". Processor 42 will then process data "A" into data "A'". Once processor 42 completes transforming "A" into "A'", processor 42 sends "A'" to processed data FIFO 43.

For each incoming data unit, e.g. "a," producer 40 sends a corresponding data unit "a'" to identification FIFO 46. The value of "a'" is determined by the outcome of the examination of cache tag storage 45 and the cache allocation and replacement algorithm in use, as follows:

If producer 40 determined that "a" produced a cache "hit," the value of "a'" indicates that processed data "A'" corresponding to "a" is in cache data storage 48 and furthermore, it indicates the location within cache data storage 48 where "A'" is stored.

If producer 40 determined that "a" produced a cache "miss" and no storage is to be allocated, the value of "a'" indicates that the processed data "A'" corresponding to "a" must be read from the processed data FIFO 43.

If producer 40 determined that "a" produced a cache "miss" and that storage is to be allocated, the value of "a'" indicates that the processed data "A'" corresponding to "a" must be read from the processed data FIFO 43, and that the data read must be written into the cache data storage 48 and furthermore, it indicates the location within cache data storage 28 where "A'" is to be written.

Consumer 44 reads the oldest data unit (e.g. "a'") from id FIFO 46. If "a'" indicates a cache "miss" where space has not been allocated in cache data storage 48, consumer 44 sends a signal to multiplexor ("MUX") 47 to select processed data FIFO 43. Consumer 44 then reads the oldest data unit "A"'" from processed data FIFO 43 which corresponds to "a". If "a'" indicates a cache "miss" where space has been allocated in cache data storage 48, consumer 44 sends a signal to MUX 47 to select processed data FIFO 43. Consumer 44 then reads the oldest data unit "A"'" from processed data FIFO 23 which corresponds to "a", and, preferably simultaneously, writes "A"'" to cache data storage 48 at the address specified in "a'". If "a'" indicates a cache "hit," consumer 44 sends a signal to MUX 47 to select cache data storage 48. Consumer 44 then reads "A"'" from the address in cache data storage 48 specified in "a'".

Since producer 40, processor 42 and consumer 44 all work at different rates, it is possible for any of the three FIFOs 41, 43, or 46 to become empty or full. If producer 40, processor 42, or consumer 44 wishes to read from a FIFO that is empty or write to a FIFO that is full, it must stall (wait) until the fill/empty condition has changed.

Thus, for processed data "A"'" which is present in cache data storage 48, corresponding to data "a" arriving at producer 40, producer 40 need not translate the vertex identifier "a" into the vertex characteristics "A", and processor 42 need not process data "A" from producer 40 to produce the processed data "A"." By avoiding re-processing data that is in the cache data storage 48, more processing power is available to handle data that is not. Moreover, data read from cache data storage 48 as a result of a cache "hit" is available to consumer 44 with a lower latency than if it had to be processed by processor 42.

The present embodiment can be further improved by adding a valid bit to each entry in cache tag storage 45. Producer 40 would determine if an entry is active by its valid bit. This would allow producer 40 to effectively clear the cache by setting all of the valid bits to null.

Figure 5:
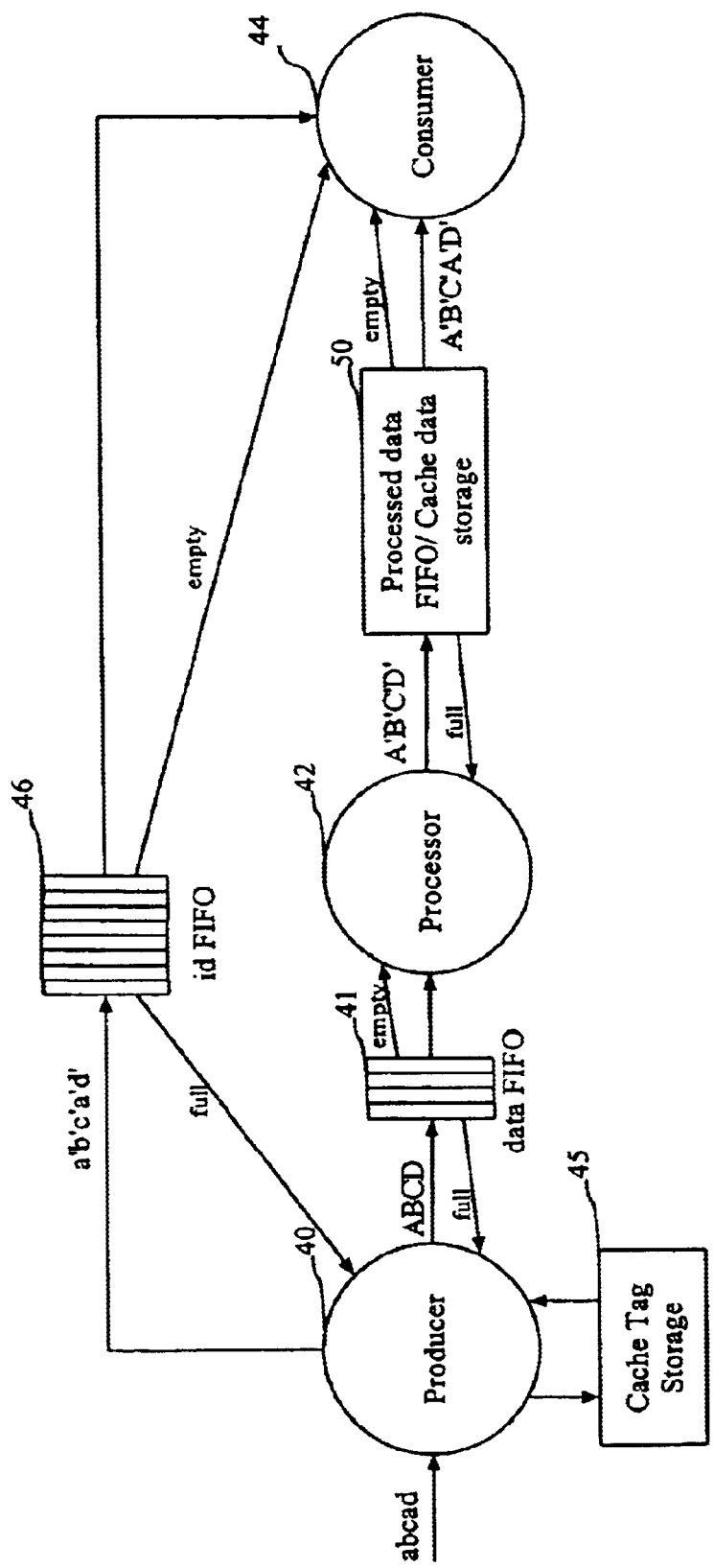
FIG. 5 is a block diagram of second exemplary embodiment of a distributed cache in accordance with the present invention.

FIG. 5 illustrates a second exemplary embodiment of a distributed cache system in accordance with the invention. In this embodiment, processed data FIFO 43 is combined with cache data storage 48 in the form of a circular buffer. The resulting processed data FIFO/cache data storage 50 performs the functions of both.

While the system described in FIG. 4 allows cache data storage 48 and processed data FIFO 43 to each be implemented in an efficient way, there are other considerations that might make combining cache data storage 48 and processed data FIFO 43 desirable. There is a fixed overhead for each memory device used (i.e. power rings and address decoder logic) which is reduced by having fewer memory devices. However, this merged system can only be implemented efficiently when the cache use a FIFO replacement algorithm, so that the addition of a new entry to the cache causes the displacement of the oldest entry currently in the cache.

Figure 6A:
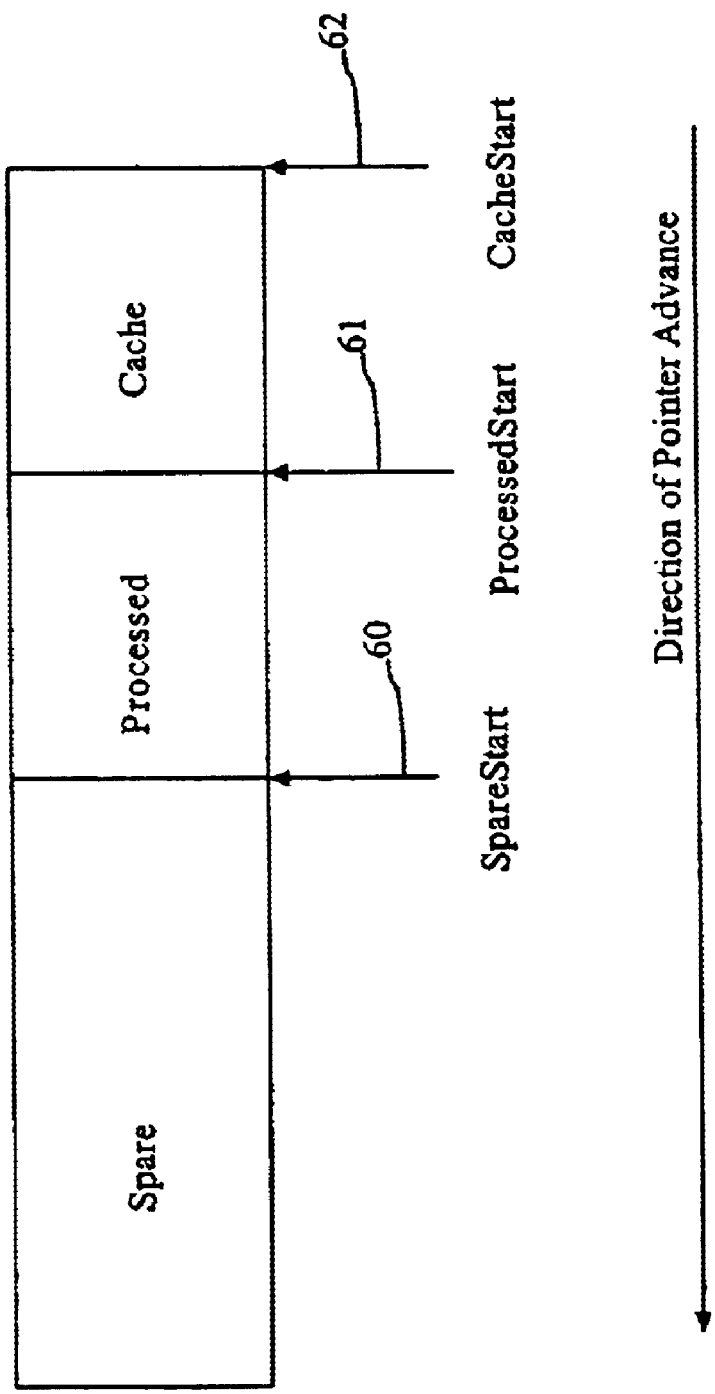
FIG. 6a and FIG. 6b are block diagrams of the memory allocation scheme for a combined processed data FIFO and cache data storage.
Figure 6B:
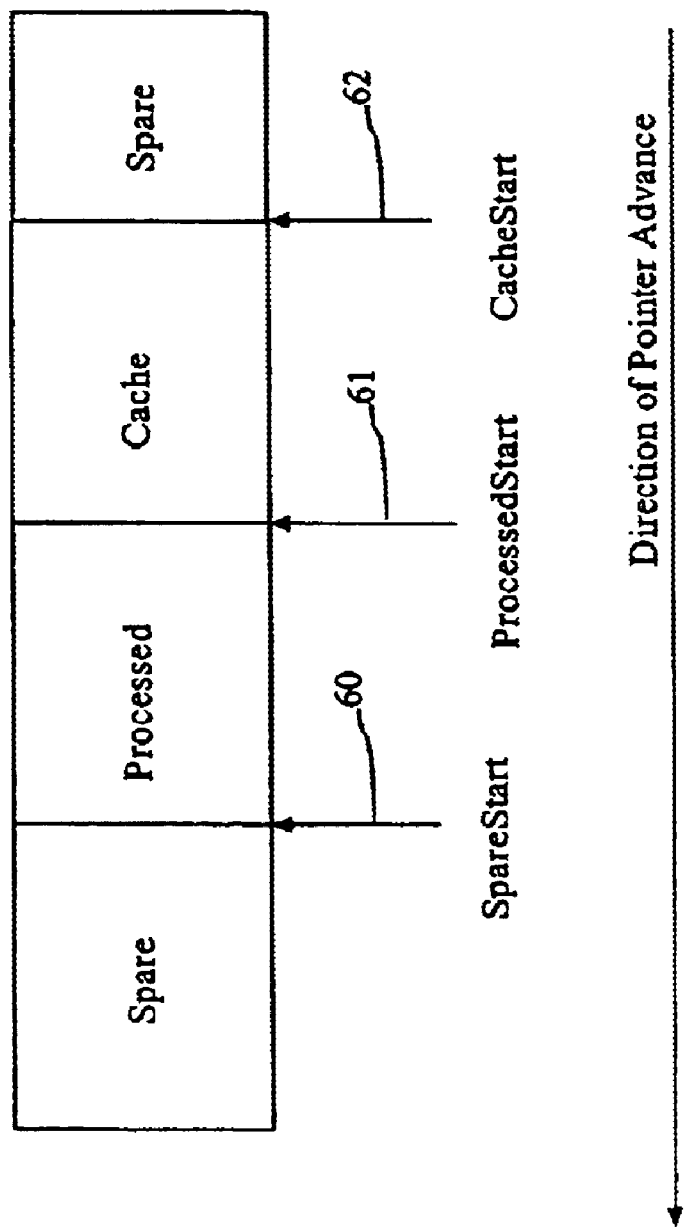

Processed data FIFO/Cache data storage 50, as represented in FIGS. 6a and 6b, has three operating pointers—SpareStart 60, ProcessedStart 61, and CacheStart 62, which delimit the Spare, Processed, and Cache regions of the data storage. This contrasts with the implementation of a normal FIFO, which has two operating pointers (a Filling pointer and an Emptying pointer which delimit the Spare and Used regions of a FIFO). When processed data FIFO/Cache data storage 50 is initialized CacheStart 62 points to the address of the first storage location in processed data FIFO/Cache data storage 50, ProcessedStart 61 points to a storage location leaving the Cache region large enough to hold a pre-determined number of processed data units corresponding to the number of cache tags that can be stored in cache tag storage 45, and SpareStart 60 is equal to ProcessedStart 61.

The processed data FIFO/Cache data storage 50 can have additional regions. The key feature is that it contains a Cache region, which moves, and some other regions, and that comparisons of pointers within processed data FIFO/Cache data storage 50 prevent the Cache region from being overwritten in order to avoid a read-before-write hazard.

In the embodiment depicted in FIG. 5, producer 40 and processor 42 behave in the same way as described for the embodiment depicted in FIG. 4.

Each time that Processor 42 generates a new processed data unit, it writes the processed data unit into the processed data FIFO/Cache data storage 50 storage locations immediately to the left of the location pointed to by SpareStart 60, and then advances SpareStart 60. The processed data FIFO/Cache data storage 50 is a circular buffer so incrementing a pointer beyond the final location (i.e. the location farthest to the left) in processed data FIFO/Cache data storage 50 causes it to wrap around to the start (i.e. the location farthest to the right), as can be seen in FIG. 6b. If SpareStart 60 equals CacheStart 62, the Spare region has shrunk to zero size, and the Processed region has grown to its maximum size. In these circumstances, processor 40 must stall to avoid overwriting the Cache region.

Consumer 44 processes entries from identification FIFO 46 in the same manner as described above with reference to FIG. 4. Each time it detects a cache "hit," it retrieves the data from the cache region of processed data FIFO/Cache data storage 50. When consumer 44 detects a cache "miss," the required data must be the oldest unit in the processed region (e.g. the data starting at the address designated by ProcessedStart 61). If ProcessedStart 61 is equal to SpareStart 60, the Processed region has shrunk to zero size and consumer 44 must stall until processor 42 has generated the next piece of data. Otherwise, the round-robin allocation policy dictates that the oldest entry in the cache must be discarded and replaced by the entry at the start of the processed region. This is accomplished by advancing CacheStart 62 and ProcessedStart 61. The Processed region shrinks in size, the Cache region remains the same size and the Spare region grows in size. The discarded entry from the cache region becomes part of the Spare region.

Although Producer 40 must determine "hit"/"miss" information , it is not necessary for the identification FIFO to contain "hit"/"miss" information. Consumer 44 can determine whether an entry is in the Cache region (and is therefore a "hit") by comparing the address of the entry with the values of CacheStart 62 and ProcessedStart 61 pointers.

The processed data FIFO/cache data storage 50 implements a circular buffer. If the data buses and processed data FIFO/cache data storage 50 width match the data unit size, a data unit will fit in a single processed data FIFO/cache data storage 50 location. Increments to CacheStart 62, ProcessedStart 61, and SpareStart 60 pointers will be by 1. If the data buses and processed data FIFO/cache data storage 50 width are smaller than the data unit size, so that a data unit will require n successive locations within processed data FIFO/cache data storage 50, increments to the pointers will be by n. The value of n need not be constant. However, if the value of n is changed, the cache must be invalidated so that pointers 60, 61, 62 can be re-initialized correctly.

Algorithms (1) and (2) show two ways to increment the pointers that control the combined processed data FIFO/cache data storage 50. Both of these algorithms are easy to implement in hardware.

Algorithm 1:

> pointer=(pointer+$n$)modulo (size of processed data FIFO/cache data storage 50)

Algorithm 2:

> if(pointer+$n$)>(size of processed data FIFO/cache data storage 50) then pointer=0 else

> pointer=pointer+$n$

Algorithm (2) leaves some processed data FIFO/cache data storage 50 locations unused when the size of processed data FIFO/cache data storage 50 is not an integer multiple of the data unit size. The advantage of algorithm (2), however, is that it makes it easier to detect the stall condition on SpareStart 60>=CacheStart 62. Using algorithm (1), this comparison has to take into account the possibility that SpareStart 60 has wrapped around the end of the buffer. Using algorithm (2), the stall condition can be simplified to SpareStart 60=CacheStart 62, which does not require the detection of wrap-around and can therefore be implemented more efficiently.

The present invention allows a processor to cache processed data without performing the caching functions itself The apparent speed of the system is increased because the processor does not determine when there is a cache hit or miss or store or retrieve the cached data. A producer performs the functions of determining whether there is a cache hit or miss while a consumer retrieves the cached data in the event of a cache hit.

Generally, each cache tag in cache tag storage 45 has an associated "valid" bit. The "valid" bit indicates that the particular location in the cache contains a valid cache tag. If it is necessary to flush the cache, all of the "valid" bits can be cleared. Once the "valid" bits are cleared, producer 40 will begin writing to cache tag storage 45 and allocating space in cache data storage 48 as though they are empty. Any data in transit at the time (for example, in id FIFO 46, data FIFO 41, or processed data FIFO 43) will still be processed correctly because the data in cache data storage 48 will not be affected until every entry in id FIFO 46 that was in transit when the cache was flushed has been processed.

Another method of flushing the cache uses pointers (that are controlled by Producer 40) to point to the first and last cache tags that have been allocated. Since cache tags are allocated in order, the cache can be flushed by setting the first cache tag pointer to the same value as the second cache tag pointer. As with the method of flushing the cache described above, any data in transit at the time the pointers are reset will be processed correctly.

Arbitrary delays can be introduced on any of the data paths without affecting the correct operation of the system. Therefore, different parts of the system can operate in independent clock domains and clock synchronization can be performed across the data paths.

While the invention has been described with reference to exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A method of caching in a system having a data producer controlling a first data storage area, a data consumer controlling a second storage area, and a data processor coupled to said data producer and said data consumer, the method comprising:
    at said data producer, receiving input data and assigning a cache tag to said input data;
    at said data producer, storing in the first data storage area a cache tag of received input data if no entry in said first data storage area is identical to said assigned cache tag;
    at said data consumer, storing in a second data storage area data produced by a processor which is based on said input data and corresponding to said assigned cache tag if no entry in said first data storage area is identical to said assigned cache tag; and
    at said data consumer, if said first data storage area contains an entry identical to said assigned cache tag, transmitting data corresponding to said assigned cache tag from said second storage area to said data consumer, otherwise selectively transmitting data corresponding to said assigned cache tag from said processor to said data consumer.

2. A method as in claim 1, wherein each of said cache tags in the first storage area has an associated valid bit.

3. A method as in claim 2, wherein assigning a cache tag in said first data storage area additionally includes setting the valid bit associated with said cache tag and;
    said data producer converts a hit indication into a miss indication if the hit indication is associated with a cache tag for which said associated valid bit is erased.

4. A method of caching comprising:
    receiving input data and assigning a cache tag to said input data;
    storing in a first data storage area a cache tag of received input data if no entry in said first data storage area is identical to said assigned cache tag;
    storing in a second data storage area data produced by a processor which is based on said input data and corresponding to said assigned cache tag if no entry in said first data storage area is identical to said assigned cache tag;
    transmitting data selectively from said second data storage area if said first data storage area contains an entry identical to said assigned cache tag or from said processor if no entry in said first data storage area is identical to said assigned cache tag; and
    storing, by a data producer, said assigned cache tag in said first data storage area;
    wherein said data producer, when a data consumer is to retrieve data processed by said processor from said second storage area, determining the address in said second data storage area that data corresponding to said cache tag is stored based on the address in said first data storage area where said cache tag is stored and transmitting to the a data consumer said corresponding address in said second data storage area where data previously produced by said processor is stored, a hit/miss indicator to indicate to said data consumer whether said data processed by said processor should be retrieved from said second data storage area and an allocation indicator to indicate whether said corresponding address is an address in said second data storage area to write data processed by said processor to.

5. A method as in claim 4, further comprising said consumer selectively retrieving consumption data from said second data storage area or said processor based on said hit/miss indicator.

6. A method as in claim 5, further comprising said consumer selectively writing the data retrieved from said processor into said second data storage area at said corresponding address based on said allocation indicator.

7. A method as in claim 4, further comprising said data producer replacing the least recently used entry in said first data storage area with the assigned cache tag if said first data storage area is full and no identical entry to said assigned cache tag is found in said first data storage area.

8. A method as in claim 4, further comprising said data producer replacing the most recently used entry in said first data storage area with the assigned cache tag if said data storage area is full and no identical entry to said assigned cache tag is found in said first data storage area.

9. A method as in claim 4, further comprising said data producer replacing the oldest entry in said first data storage area with the assigned cache tag if said first data storage area is full and no identical entry to said assigned cache tag is found in said first data storage area.

10. A method as in claim 9, further comprising said data producer maintaining a first pointer associated with the most-recently-stored entry in said first data storage device and a second pointer associated with the oldest entry in said first data storage device.

11. A method as in claim 10, further comprising said data producer clearing said first data storage area by setting said first pointer equal to said second pointer.

12. A method as in claim 10, wherein assigning a cache tag in said first data storage area additionally includes advancing said first pointer and;
said data producer converting a hit indication into a miss indication if the hit indication is associated with a cache tag which does not lie within the region between said first pointer and said second pointer.

13. A method as in claim 4, further comprising said data producer using a deterministic algorithm to select an entry in said first data storage area and replacing said entry with the assigned cache tag if said first data storage area is full and no identical entry to said assigned cache tag is found in said first data storage area.

14. A method as in claim 4, further comprising said data producer producing a derived unit of data from said input data, and said processor uses said derived unit of data to produce said produced data.

15. A method as in claim 4, further comprising said data producer storing said corresponding address, said hit/miss indicator and said allocation indicator in a third data storage area;
said data producer storing in a fourth data storage area data generated by said data producer corresponding to said input data if no matching entry was found in said first data storage area;
said processor retrieving from said fourth data storage area said data generated by said data producer;
said processor storing in a fifth data storage area data produced by said processor;
said data consumer retrieving data from said third data storage area; and
said data consumer retrieving said data produced by said processor from said second data storage area if said hit/miss indicator indicates that a match was found in said first data storage area or from said fifth data storage area if a match was not found in said first data storage area.

16. A method as in claim 15, wherein said third data storage area, said fourth data storage area and said fifth data storage area operate as first-in-first-out queues of finite size; and
said data producer stalling if at attempt is made to write to said third or fourth data storage area, and said third or fourth storage area are full; and
said data processor stalling if an attempt is made to write to said fifth data storage area and said fifth data storage area is full; and
said data processor stalling if an attempt is made to read from said fourth data storage area and said fourth data storage area is empty; and
said data consumer stalling if an attempt is made to read from said third or said fifth data storage area and said third or fifth data storage area is empty.

17. A method of caching comprising:
receiving input data and assigning a cache tag to said input data;
storing in a first data storage area a cache tag of received input data if no entry in said first data storage area is identical to said assigned cache tag;
storing in a second data storage area data produced by a processor which is based on said input data and corresponding to said assigned cache tag if no entry in said first data storage area is identical to said assigned cache tag; and
transmitting data selectively from said second data storage area if said first data storage area contains an entry identical to said assigned cache tag or from said processor if no entry in said first data storage area is identical to said assigned cache tag;
a consumer retrieving data from said processor and storing said data in said second data storage area;
a data producer determining the address in said second data storage area where said data is stored based on the address in said first data storage area where said cache tag is stored and transmitting to said data consumer the address in said second data storage area where said data is stored when said assigned cache tag is identical to a cache tag stored in said first data storage area; and
said consumer retrieving said data produced by said processor from said second data storage area using said address.

18. A method as in claim 17, further comprising said data producer replacing the least recently used entry in said first data storage area with the assigned cache tag if said first data storage area is full and no identical entry to said assigned cache tag is found in said first data storage area.

19. A method as in claim 17, further comprising said data producer replacing the most recently used entry in said first data storage area with the assigned cache tag if said first data storage area is full and no identical entry to said assigned cache tag is found in said first data storage area.

20. A method as in claim 17, further comprising said data producer replacing the oldest entry in said first data storage area with the assigned cache tag if said first data storage area is full and no identical entry to said assigned cache tag is found in said first data storage area.

21. A method as in claim 20, further comprising said data producer maintaining a first pointer associated with the most-recently-stored entry in said first data storage device and a second pointer associated with the oldest entry in said first data storage device.

22. A method as in claim 21, further comprising said data producer clearing said first data storage area by setting said first pointer equal to said second pointer.

23. A method as in claim 21, wherein assigning a cache tag in said first data storage area additionally includes advancing said first pointer and;

said data producer converting a hit indication into a miss indication if the hit indication is associated with a cache tag which does not lie within the region between said first pointer and said second pointer.

24. A method as in claim 17, further comprising said data producer using a deterministic algorithm to select an entry in said first data storage area and replacing said entry with the assigned cache tag if said first data storage area is full and no identical entry to said assigned cache tag is found in said first data storage area.

25. A method as in claim 24, further comprising said data producer clearing said first data storage area by erasing all valid bits in said first data storage area.

26. A method of caching comprising:

receiving input data and assigning a cache tag to said input data; storing in a first data storage area a cache tag of received input data if no entry in said first data storage area is identical to said assigned cache tag;

storing in a second data storage area data produced by a processor which is based on said input data and corresponding to said assigned cache tag if no entry in said first data storage area is identical to said assigned cache tag; and transmitting data selectively from said second data storage area if said first data storage area contains an entry identical to said assigned cache tag or from said processor if no entry in said first data storage area is identical to said assigned cache tag;

wherein said second data storage area is divided into a cache region, processed data region and a spare region by pointers; and wherein cached data is stored in said cache region, data produced by said processor that has not been retrieved by said a data consumer is stored in said processed data region and said spare region is empty.

27. A method as in claim 26, further comprising said data consumer advancing the pointer separating said cache region from said processed region into the processed region when said data consumer retrieves data from said processed region;

said processor advancing the pointer separating said processed region from said spare region into said spare region when said data processor stores data in said processed region; and said data consumer advancing said pointer separating said cache region and said processed region into said processed region and said pointer separating said spare region and said cache region into said cache region when the storage space in said cache region equals a threshold and said data consumer retrieves data from said processed region.

28. A method as in claim 26, further comprising said data producer clearing said first data storage area by setting a pointer associated with the most recently stored entry in said first data storage device equal to a pointer associated with the oldest entry in said first data storage area.

29. A system for caching data comprising:

a producer, which produces a derived unit of data from an incoming unit of data;

a processor, which transforms said derived unit of data into a corresponding processed unit of data and sends said processed unit of data to a consumer;

a consumer, which uses said processed units of data;

a cache tag storage device coupled to said producer; and a cache data storage device coupled to said processor and said consumer;

wherein said data producer assigns a cache tag to said incoming unit of data and compares said assigned cache tag to each entry in said cache tag storage; if said assigned cache tag does not match an entry in said cache tag storage, said data producer sends a derived unit of data corresponding to said incoming unit of data to said processor, selects an entry in said cache tag storage, writes said cache tag to said selected entry in said cache tag storage, sends the corresponding address in said cache data storage device, a hit/miss indicator and an allocation indicator to said consumer; and if said assigned cache tag does match an entry in said cache tag storage, said data producer determines what address in said cache data storage device corresponds to the address in said cache tag storage device where said matching cache tag is stored and sends said corresponding address and a hit/miss indicator to said data consumer.

30. The system as in claim 29, further comprising said processor generating a processed data unit from said derived data unit and sending said processed data unit to said consumer.

31. The system as in claim 29, further comprising said consumer reading said processed data unit from said processor and writing said processed unit of data to a received cache data storage address when said assigned cache tag does not match an entry in said cache tag storage.

32. The system as in claim 29, further comprising said consumer reading said processed data unit from a received cache data storage address when said assigned cache tag matches a unit of data in said cache tag storage.

33. A system as in claim 29, further comprising said data producer replacing the least recently used entry in said cache tag storage with the assigned cache tag if said cache tag storage is full and no entry identical to said assigned cache tag is found in said cache tag storage.

34. A system as in claim 29, further comprising said data producer replacing the most recently used entry in said cache tag storage with the assigned cache tag if said cache tag storage is full and no entry identical to said assigned cache tag is found in said cache tag storage.

35. A system as in claim 29, further comprising said data producer replacing the oldest entry in said cache tag storage with the assigned cache tag if said cache tag storage is full and no entry identical to said assigned cache tag is found in said cache tag storage.

36. A method as in claim 29, further comprising said data producer using a deterministic algorithm to select an entry in said cache tag storage and replacing said entry with the assigned cache tag if said cache tag storage is full and no entry identical to said assigned cache tag is found in said cache tag storage.

37. A system as in claim 29, further comprising a data storage area coupled to said data producer and said processor;

wherein when said data producer sends said derived unit of data, said derived unit of data is stored in said data storage area and said processor retrieves said derived unit of data from said data storage area.

38. A system as in claim 29, further comprising a data storage area coupled to said producer and said data consumer;

wherein when said data producer sends an address in said cache data storage to retrieve data from or write data to, said hit/miss indicator and said allocation indicator, said address in said cache data storage to retrieve data from or write data to, said hit/miss indicator and said allocation indicator are stored in said data storage device and said data consumer retrieves said address in said cache data storage to retrieve data from or write data to, said hit/miss indicator and said allocation indicator from said data storage device.

39. A system as in claim 29, further comprising a data storage area coupled to said processor and said data consumer;
wherein when said processor sends said processed unit of data, said processed unit of data is stored in said data storage area and said data consumer retrieves said processed unit of data from said data storage area.

40. A system as in claim 29, wherein each of said cache tags stored in said cache tag storage device has an associated valid bit.

41. A system as in claim 40, further comprising said data producer clearing said cache tag storage device by erasing all of said associated valid bits.

42. A system for caching data comprising:
a producer, which produces a derived unit of data from an incoming unit of data;
a processor, which transforms said derived unit of data into a corresponding processed unit of data;
a consumer, which uses said processed units of data;
a cache tag storage device coupled to said producer;
a first data storage device coupled to said producer and said consumer;
a second data storage device coupled to said producer and said processor; and
a cache data storage device coupled to said processor and said consumer;
wherein said data producer assigns a cache tag to said incoming unit of data and compares said assigned cache tag to each entry in said cache tag storage; if said assigned cache tag does not match an entry in said cache tag storage, said data producer stores a unit of data corresponding to said incoming unit of data in said second data storage device, stores said assigned cache tag in said cache tag storage, determines the corresponding address in said cache data storage and stores said corresponding address in said first data storage device, and if said assigned cache tag does match an entry in said cache tag storage, said data producer stores in said first data storage device the address in said cache data storage containing processed data corresponding to said matched entry in said cache tag storage.

43. The system as in claim 42, wherein said cache data storage area is divided into a cache region, processed data region and a spare region by pointers.

44. The system as in claim 43, further comprising said processor storing said processed data in said processed data region and advancing said pointer between said processed data region and said spare region.

45. The system as in claim 44 further comprising said processor stalling on a write to said cache data storage device if the size of said spare region is zero.

46. The system as in claim 43, further comprising said data consumer retrieving said processed data from the address in said cache data storage device specified in said first data storage device; and said consumer advancing said pointer separating said cache region from said processed region into said processed region if said specified address is in said processed region and advancing said pointer separating said spare region from said cache region into said cache region if said cache region exceeds a predetermined maximum size.

47. The system as in claim 46, further comprising said pointers being controlled such that said cache storage device behaves as a circular buffer, said control involving:
advancing each pointer by a fixed value;
setting the value of the pointer to zero if the value of the pointer exceeds the size of said cache storage device.

48. The system as in claim 46, further comprising said consumer stalling on a read from said cache data storage device if said processed region is of zero size.

49. A system as in claim 43, further comprising said data producer replacing the oldest entry in said cache tag storage with the assigned cache tag if said cache tag storage is full and no entry identical to said assigned cache tag is found in said cache tag storage.

50. A system as in claim 43, wherein said cache tag storage device further comprises:
a first pointer associated with the most recently stored entry in said cache tag storage device; and
a second pointer associated with the oldest entry in said cache tag storage device.

51. A system as in claim 50, further comprising said data producer clearing said cache tag storage device by setting said first pointer equal to said second pointer.

52. A method as in claim 50, wherein assigning a cache tag in said cache tag storage device additionally includes advancing said first pointer and;
said producer converting a hit indication into a miss indication if the hit indication is associated with a cache tag which does not lie within the region between said first pointer and said second pointer.

53. A system for caching data, comprising:
a data producer, which produces units of data;
a data processor, which transforms said units of data into processed units of data;
a data consumer, which uses said processed units of data;
a cache memory, comprising a cache tag memory controlled by said data producer and a cache storage memory controlled by said data consumer, said cache memory storing at least some of said units of data and said processed units of data in said cache storage memory, and corresponding identification information of said at least some units of data and said processed units of data in said cache tag memory.

54. A method for caching data, comprising:
at a data producer, producing units of data;
at a data processor, transforming said units of data into processed units of data;
at a data consumer, using said processed units of data;
at a cache memory, storing at least some of said units of data and said processed units of data in a cache storage portion of said cache memory and corresponding identification information in a cache tag portion of said cache memory, said cache tag portion being controlled by said data producer and said cache storage portion being controlled by said data consumer.

* * * * *

UNITED STATES PATENT AND TRADEMARK OFFICE
CERTIFICATE OF CORRECTION

PATENT NO. : 6,754,772 B2
DATED : June 22, 2004
INVENTOR(S) : Neal A. Crook et al.

It is certified that error appears in the above-identified patent and that said Letters Patent is hereby corrected as shown below:

Column 8,
Line 58, "the a data" should read -- the data --;

Column 10,
Line 5, "at" should read -- an --.

Signed and Sealed this

Twenty-ninth Day of November, 2005

JON W. DUDAS
*Director of the United States Patent and Trademark Office*